United States Patent [19]

Linder

[11] 4,044,742
[45] Aug. 30, 1977

[54] METHOD AND APPARATUS FOR PROCESSING FUEL INTO AN INTERNAL COMBUSTION ENGINE

[76] Inventor: Henry C. Linder, 131 Biz Point Road, Anacortes, Wash. 98221

[21] Appl. No.: 605,665

[22] Filed: Aug. 18, 1975

[51] Int. Cl.² ............................................. F02M 31/00
[52] U.S. Cl. ............................ 123/122 E; 123/122 H; 261/144; 261/145; 165/32
[58] Field of Search ............... 123/122 E, 122 H, 133, 123/25 R, 25 A, 122 AA, 122 A; 165/51; 261/144, 142, 145

[56] References Cited

U.S. PATENT DOCUMENTS

| | | | |
|---|---|---|---|
| 1,319,718 | 10/1919 | Martin | 123/122 H |
| 1,532,770 | 4/1925 | Mader | 123/122 AA |
| 2,843,216 | 7/1958 | Powell | 123/25 A |
| 2,884,917 | 5/1959 | Quinby | 123/133 |
| 3,253,647 | 5/1966 | Deshaies | 123/122 E |
| 3,472,214 | 10/1969 | Moon | 123/122 E |
| 3,780,714 | 12/1973 | Dillow | 123/122 AA |
| 3,834,360 | 9/1974 | Blitch | 123/25 A |
| 3,880,124 | 4/1975 | Stratton | 123/25 R |

Primary Examiner—Ronald H. Lazarus
Attorney, Agent, or Firm—Thomas W. Secrest

[57] ABSTRACT

This invention is directed to an apparatus and method for forming an air-fuel mixture vapor for introduction and burning in an internal combustion engine. With this invention, it is possible to realize a more complete vaporization of the fuel and a more complete mixing of the air and fuel to form said air-fuel mixture vapor. The result is that in an automotive vehicle using an internal combustion engine, it is possible to realize more mileage from a given volume of fuel than can be realized from an engine not using this invention.

15 Claims, 8 Drawing Figures

METHOD AND APPARATUS FOR PROCESSING FUEL INTO AN INTERNAL COMBUSTION ENGINE

THE GENERAL BACKGROUND OF THE INVENTION

Today, people are becoming more cognizant of the needs to conserve gasoline. The gasoline is increasing in price and people are interested in securing more miles per gallon of gasoline. In fact, in many instances, it is necessary that better mileage be realized from gasoline in order for people to continue driving their automobiles.

One of the components in processing fuel for burning in an internal combustion engine is the carburetion system. With an improvement in the carburetion system and the vaporization of the fuel, it is possible to realize better gasoline mileage or more miles per gallon of gasoline from a given volume of fuel. With this in mind, I have designed and made units to be used with the carburetion system to increase the vaporization of the fuel and to form a more homogenous air-fuel mixture vapor to realize more miles from a given volume of gasoline.

With this invention, installed on my own automobile for experimental purposes, I have increased the mileage from a given volume of gasoline.

THE GENERAL DESCRIPTION OF THE INVENTION

In this invention, there is a means and a method for heating the fuel prior to introducing the fuel into the carburetor. This means is referred to as a fuel expander. The temperature of the fuel is adjusted to a predetermined desirable temperature. The fuel expander makes it possible to heat the fuel, when necessary, to the desired predetermined temperature. And, the fuel expander makes it possible, when necessary, to cool the fuel to the desired predetermined temperature. With the fuel expander, it is possible to control the temperature of the fuel to the desired predetermined temperature.

Another facet of the fuel expander is that the fuel in the carburetor can be circulated through the fuel expander so as to maintain the fuel in the carburetor at the desired predetermined temperature.

Another feature of the invention is a humidifier for humidifying the air prior to the air passing to the carburetor. It is possible to increase the moisture content or the relative humidity of the air prior to flowing to the carburetor. Generally, moisture in the air-fuel mixture vapor which is introduced into and burned in the internal combustion engine provides a more uniform burning of the fuel and a more desirable burning of the fuel. This, in itself, results in an increase in the gas mileage realized from a given volume of fuel.

The third feature of this invention is an air-fuel mixture vaporizer which is positioned between the carburetor and the internal combustion engine. The air-fuel mixture vaporizer heats and mixes, by turbulence, the air-fuel mixture vapor from the carburetor. This results in a more uniform mixture of fuel and air for introduction into the internal combustion engine to realize a more uniform burning of the fuel and to realize a more complete burning of the fuel in the internal combustion engine, and, as a consequence, better mileage from a given volume of gasoline for a motor vehicle using an internal combustion engine.

The fuel expander may be used by itself or may be used in conjunction with either the humidifer or the vaporizer or may be used in conjunction with the humidifier and the vaporizer. Further, the humidifier may be used by itself or in conjunction with the vaporizer. And, finally, the vaporizer may be used by itself.

THE OBJECTS AND THE ADVANTAGES

I consider that there are a number of objects and advantages of this invention of which the following are a few. An important object and advantage of this invention is to provide a means and method for increasing the gasoline mileage, from a given volume of fuel, for an automotive vehicle using an internal combustion engine; another important object is to provide a means and a method whereby an internal combustion engine uses less fuel for substantially the same performance; a further important object and advantage is to provide such a means and a method which is compatible with the existing internal combustion engine and with existing internal combustion engines as used in automobiles; an additional object and advantage is to provide a fuel expander for regulating the temperature of fuel to a desired predetermined temperature and, which fuel expander is simple in operation and maintenance; a further advantage is a fuel expander of a straightforward design and application; an additional object is to provide a means and method for lessening the pollutants in the exhaust of an internal combustion engine; a side benefit and advantage of this invention is an increase in the life of an internal combustion engine; and, a most important object and advantage of this invention is the maintenance of the fuel at the desired predetermined temperature to prevent vaporization of the fuel.

These, and other and important objects and advantages of the invention will be more particularly brought forth upon reference to the detailed description of the invention, the appended claims, and the accompanying drawings.

THE DETAILED DESCRIPTION OF THE INVENTION

Figure 1:
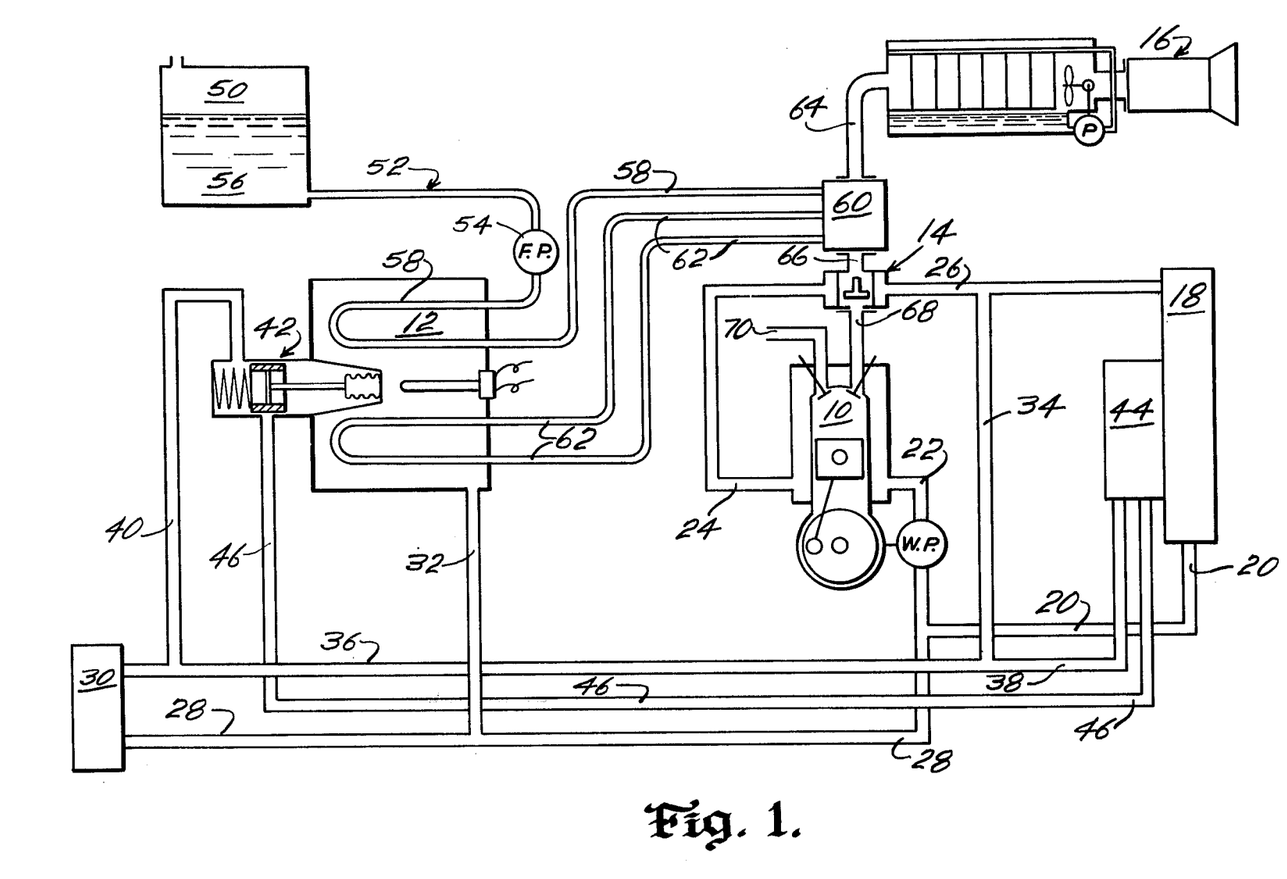
FIG. 1 is a schematic illustration of a means and a method for processing fuel prior to introduction into an internal combustion engine and illustrates a fuel expander, a humidifier, and an air-fuel mixture vaporizer.

In FIG. 1, there is schematically illustrated the internal combustion engine 10, the fuel expander 12, the air-fuel mixtuer vaporizer 14, and the humidifer 16 as used and associated together for decreasing the consumption of fuel without any substantial change in the performance of the internal combustion engine 10.

In FIG. 1, it is seen that there is a radiator 18. The radiator 18 has a cold water outlet 20 which branches into a line 22 which connects with the water jacket of the internal combustion engine 10. The internal combustion engine 10 has a hot water exit line 24 which connects with the air-fuel vaporizer 14 to supply heat energy to the vaporizer 14. The air-fuel vaporizer 14 has an exit line 26 which returns to the radiator 18 so that the hot water from the internal combustion engine 10 can be cooled for recycling purposes.

The cold water line 20 from the car radiator 18 also branches into a line 28 which connects with the heater 30.

The line 28 branches into a line 32 which connects with the fuel expander 12.

The hot water line 26 branches into a hot water line 34. The hot water line 34 in turn branches into a line 36 and into a line 38. The branch 36 connects with the heater 30. Further, the line 36 branches into a line 40 which feeds into the valve control means 42 associated with the fuel expander 12.

The line 38 from the hot water line 34 leads into an auxiliary radiator 44. The auxiliary radiator has an exit cold water line 46 which feeds into the valve control means 42. Naturally, the purpose of the auxiliary radiator 44 is to cool the hot water from the water jacket of the internal combustion engine 10.

The line 32 from the fuel expander 12 and the line 28 are, essentially, cold water return lines for introducing the cold water into the water jacket for the internal combustion engine.

The lines 36 and 40 are feeder lines for the heater 30 and the valve control means 42 and the fuel expander 12.

Also, the cold water line 46 is a feeder line for the valve control means 42 and the fuel expander 12.

There is a fuel tank 50 which has an exit line or fuel line 52. In the fuel line 52 is a fuel pump 54. The fuel pump 54 connects with the line 58 which runs into the fuel expander 12 and out of the fuel expander 12 and connects with the carburetor 60.

Another line 62 connects with the bottom of the bowl of the carburetor and runs into the fuel expander 12 and then runs out of the fuel expander 12 and connects with the top of the bowl of the carburetor 60. At times, it may be desired to use the line 62 to maintain the temperature of the fuel in the carburetor at the desired predetermined temperature.

A humidifier 16 connects with and leads into the carburetor 60 by means of line 64.

The air-fuel mixture vaporizer 14 connects with the carburetor 60 by means of a line 66 and leads into the internal combustion engine 10 by means of a line 68.

There is an exhaust line 70 leading from the internal combustion engine 10 to the exhaust system for the internal combustion engine 10.

Figure 2:
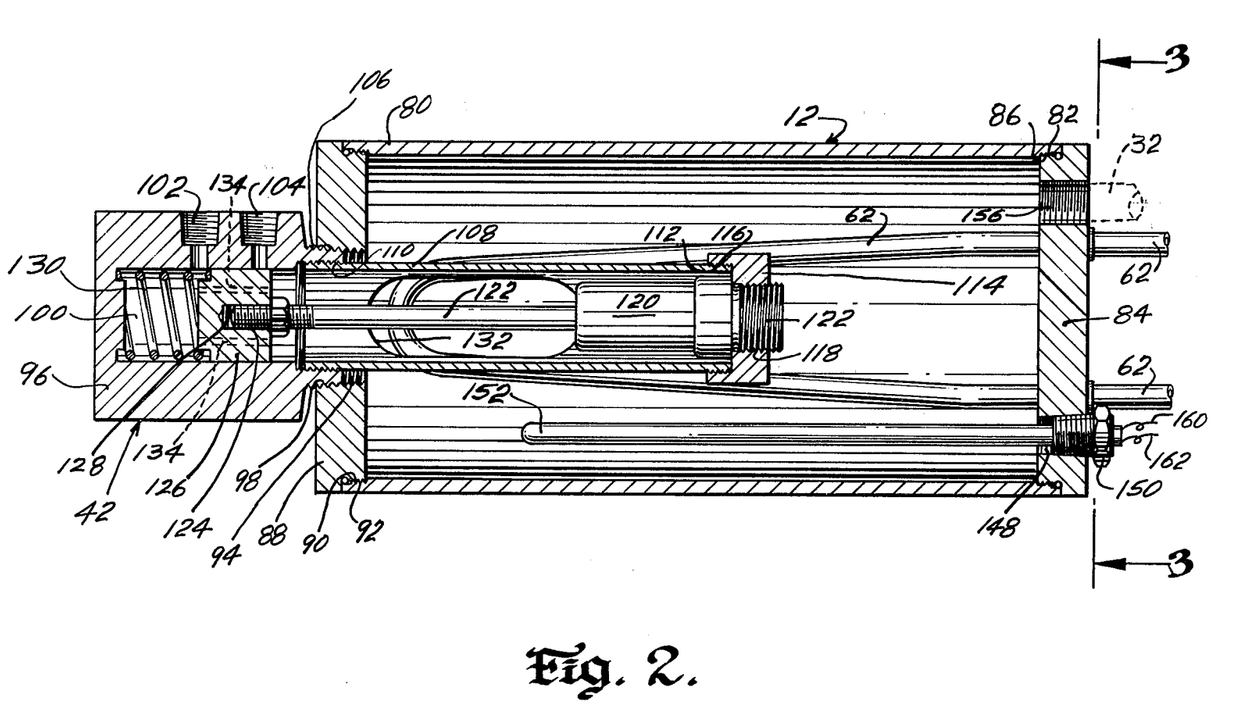
FIG. 2 is a longitudinal, vertical, cross-sectional view of the fuel expander and illustrates the valve for controlling the flow of hot water and cold water into the fuel expander to realize a desired predetermined temperature.

With reference to FIG. 2 and the fuel expander 12 and associated valve 42, it is seen that the fuel expander 12 comprises a tubular or right circular cylindrical housing 80 which is tapped on its right end at 82 so as to receive the heater end plate 84 which is externally threaded at 86. The end plate 84 is screwed onto the housing 80.

At the left end of the housing 80, there is a valve end plate 88 which is threaded at 90. The housing 80 is internally tapped at 92 so as to receive the valve end plate 88.

In the valve end plate 88, there is a tapped central opening 94 for receiving the housing 96 of the mixing valve 42. The housing 96 has an externally threaded nipple 98 for screwing into the tapped central opening 94. Also, the housing 96 has a central passageway 100.

In the wall of the housing 96 is a hot water tapped passageway 102 and in the housing 96 is a cold water tapped passageway 104.

At the nipple end of the central passageway 100, there is a tapped passageway 106 for receiving a tubular support housing 108 which is externally threaded at 110.

The outer end of the support housing 108 is externally threaded at 112 and receives an end plate 114 which is internally tapped at 116.

In the end plate 114, there is a tapped central opening 118.

There is screwed into the tapped central opening 118, a thermostat cartridge 120 have external threads 122 on one end. The thermostat cartridge 12- has a rod 122 which projects, in FIG. 2, left from the cartridge 120. The rod 122 has an external threaded end 124 which is screwed into a valve head 126. The externally threaded rod 124 is screwed into central tapped passageway 128 in the valve head 126.

Between the end of the valve head 126 and the end of the housing 96, there is positioned a spring 130. The spring 130 urges the valve head 126 toward the thermostat cartridge 120.

In the support housing 108 there are openings 132 to allow hot water and cold water to flow from the central passageway 100 and through the support housing 108 and through the passageways 132 into the housing 80.

In the valve head 126 are a number of longitudinal passageways 134 connecting the spring end of the central passageway 100 with the nipple end of the central passageway 100 so that hot water can flow through the hot water tapped passageway 102, into the spring end of the central passageway 100, through the longitudinal passageways 134 in the valve head 126, and into the support housing 108 and through the opening 132 and into the housing 80.

Figure 3:
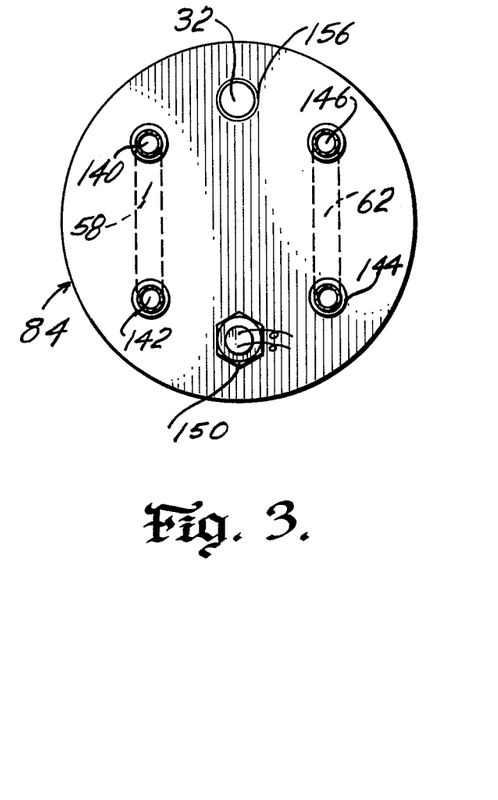
FIG. 3, taken on line 3—3 of FIG. 2, is an end elevational view of said fuel expander.

In FIGS. 1, 2, and 3, it is seen that there are lines 58 and 62 in the housing 80. More particularly, the lines 62 connect with the lower part of the bowl of the carburetor 60 and also with the upper part of the bowl of the carburetor 60 so as to flow fuel from the carburetor 60 through the housing 80 and back to the carburetor 60. Also, the line 52 connects with the fuel tank 50 and the fuel pump 54. The fuel pump 54 connects with the fuel line 58 which enters the housing 80 through the heater end plate 84. As previously stated, the line 58 leaves the housing 80, or the fuel expander 12, and connects with the carburetor 60 to introduce fuel into the carburetor 60.

For ease of illustration, the entrance of a fuel line 58 into the housing 80 will be identified by reference numeral 140 and the exit of the fuel line 58 from the housing 80 will be identified by reference number 142. Also, for ease of illustration, the entrance of the line 62 into the housing 80 will be identified by reference numeral 144 and the exit of the line 62 from the housing 80 will be identified by reference numeral 146.

In FIG. 2, it is seen that in the heater end 84 that there is a tapped passageway 148 in the lower part of the end plate 84. In this tapped passageway 148, there is positioned a bushing 150 which positions an auxiliary electric heater 152.

In the heater end plate 84, near the upper part, there is a tapped passageway 156. There is screwed into the tapped passageway 156 a threaded pipe 32 which returns water from the fuel expander 12 to cold water line 28, see FIG. 1.

In operation, the fuel expander 12 and the valve 42 function to maintain the liquid in the fuel expander 12 at a desired temperature so as to maintain the gasoline in the carburetor at said desired temperature. The desired temperature is in the range of about 130° F to, approximately, 140° F.

The thermostat cartridge 120 is designed to operate in the range of about 125° F to, approximately, 135° F.

Assume that the internal combustion engine has not been operated for a number of hours so that the internal combustion engine is cold. This means that the water in the auxiliary radiator 44 and also in the car radiator 18 is cold and that the water in the fuel expander 12 is cold. The thermostat cartridge 120 is retracted so that the valve head 126 covers the cold water passageway 104 and prevents water entering into the central passageway 100 and into the housing 80. Also, the valve head 126 is away from the hot water passageway 102 so that hot water can flow freely into the central passageway 100 and into the housing 80. Upon, initially, starting the internal combustion engine, it may be desirable to use the auxiliary electric heater 152 to heat the liquid in the housing 80. Further, with the heating of the water in the radiators 18 and 44, a warmer water will enter through hot water passageway 102 and into the central passageway 100 and flow into the housing 80. The temperature of the liquid in the housing 80 increases and the thermostatic cartridge 120 expands so as to move the valve head 126 toward the end of the central passageway 100 and to compress the spring 130. When the temperature of the liquid in the housing 80 reaches, approximately, 135° F, the thermostat cartridge 120 has expanded sufficiently to move the valve head 126 over the hot water passageway 102 so as to prevent hot water flowing into the central passageway 100. To repeat, this occurs when the temperature of the liquid in the housing 80 is about 135° F, viz., in the desired temperature range of about 130° F to, approximately, 140° F. The fuel 156 flowing in the fuel line 58 is heated to, approximately, 135° F. If there is the line 62 connecting with the carburetor 60 and the fuel expander 12, the fuel in the line 62 is heated to, approximately, 135° F. Cold water port is closed at all times except when the temperature exceeds the desired temperature and cold water is needed to cool the fuel to a temperature in the desired range.

If the temperature of the liquid in the housing 80 falls below about 130° F, the cold water passageway 104 is covered by the valve head 126 so as to prevent the flow of cold water into the passageway 100 and the hot water passageway 102 is opened so that hot water can flow into the central passageway 100 and into the housing 80. In this manner, the temperature of the water in the housing 80 can be increased to a temperature in the range of about 130° F to, approximately, 140° F.

If the temperature of the water in the housing 80 is greater than about 140° F, the thermostat cartridge 120 expands so as to move the valve head 126 over the hot water passageway 102 to prevent the flow of hot water into the central passageway 100 and also the valve head 126 does not cover the cold water passageway 104 so as to allow cold water to flow into the central passageway 100 to allow cold water to flow through the passageway 104 and into the housing 80 so as to cool the water in the housing 80 to be in a range of about 130° F to, approximately, 140° F.

An auxiliary electric heater brings the expander to 100° F then shuts off when the hot incoming water reaches that temperature or a greater temperature.

Naturally, after the water in the housing 80 has reached the temperature in the range of about 130° F to, approximately, 140° F, there is no need for the auxiliary electric heater 152. The auxiliary electric heater 152 can connect with a source of electricity, such as a battery, by means of wires 160 and 162.

When the expander reaches its desired temperature, both ports are closed, placing the mixing valve in a parked position. Then the valve can move to allow the flow of cold water or hot water as required.

From the foregoing, it is seen that the fuel expander 12, in conjunction with the valve control means 42, controls the temperature of the fuel 56, when the internal combustion engine 10 is fully operational and up to the desired temperature, so as to introduce fuel at a predetermined temperature in the range of about 130° F to, approximately, 140° F into the carburetor 60.

I have constructed a fuel expander 12 and have placed it on my automobile, a 1972 El Camino, with the 307 cu. in. V-8 engine and automatic engine. The mileage on the automobile was about 24,000 miles. It is to be realized by the reader that the fuel expander 12 and valve control means 42 I made and used on my automobile was made and used by itself. There was not used the humidifier 16 and there was not used the air-fuel mixture vaporizer 14. There was used only the fuel expander 12 and valve control means 42.

In Table No. 1, Relative Mileage, there is indicated the mileage on said automobile for a speed of 50 miles an hour and with no heat to the fuel expander 12 or a heat of about 60° F. The mileage was 15.2 miles per gallon. With the temperature of the fuel expander 12 at 100° F, the mileage increased to 17.2 miles per gallon. With the temperature of the fuel expander 12 at 130° F, the mileage increased to 18.8 miles per gallon. From this data for 50 mph, it is seen that by operating the fuel expander at 130° F, there is an increased mileage of approximately 23% as compared with the fuel expander being at a temperature of 60° F.

A test was run on said engine at 30 mph and no heat in the fuel expander or a temperature of about 60° F. The mileage was 18.5 miles per gallon. With the fuel expander at a temperature of 130° F, the mileage increased to 28 miles per gallon, or a percentage increase of about 41%.

TABLE I

RELATIVE MILEAGE

| | Temperature of fluid expander | Mileage Miles/gallon |
| --- | --- | --- |
| 50 miles per hour no heat | 60° F | 15.2 |
| | 100° F | 17.2 |
| | 130° F | 18.8 |
| 30 miles per hour no heat | 60° F | 18.5 |
| | 130° F | 28 |

From these figures, it is seen that by heating the gasoline or fuel 56 to a temperature of about 130° F, there is an increase in the mileage received from a given volume of fuel. To repeat, one of the advantages of this fuel expander 12 is to maintain the temperature of the fuel 56 in a desired range of about 130° F to, approximately, 140° F. The fuel expander 12 has the capability of heating fuel 56 at a temperature less than 130° F and also has the important capability of cooling fuel at a temperature greater than about 140° F. The result is a fuel maintained in the desired temperature range of about 130° to about 140° F. The temperature is held to within 3° F of the desired temperature. For example, the 140° F sensor operates between 138° and 141° F.

Figure 4:
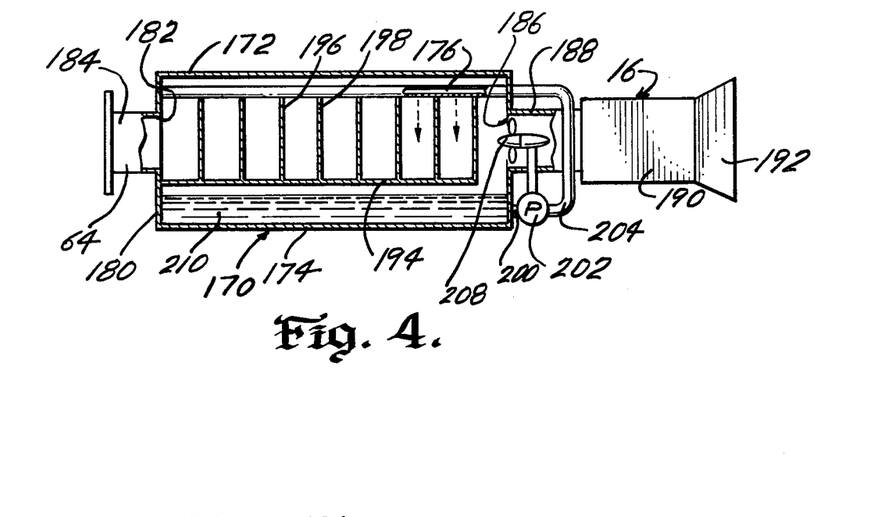
FIG. 4 is a lateral, vertical, cross-sectional view of a humidifier for humidifying air prior to introduction into a carburetor.
Figure 5:
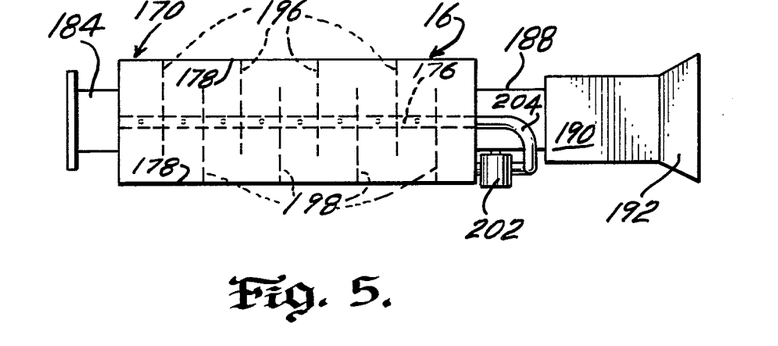
FIG. 5 is a plan view of the humidifer of FIG. 4.

In FIGS. 4 and 5, there is illustrated a humidifier 16 having a housing 170 with a top member 172 and bottom member 174, a side wall 176 connecting the members 172 and 174 and another side wall 178 connecting the members 172 and 174.

In FIG. 5, it is seen that there is a left end wall 180 having an opening 182. A housing 184 connects with the opening 182 and the housing 184 leads to the carburetor 60.

In FIG. 4, it is seen that in the right wall there is an opening 186 which connects with an inlet housing 188. The inlet housing 188 connects with an air filter 190 which in turn connects with an air inlet 192.

In the housing 170, there is a support plate 194, positioned below the outlet 182. There is supported on the support plate 194 a plurality of alternating baffles 196 and 198. In FIG. 5, it is seen that these baffles 196 and 198 alternate with each other so as to cause turbulence in the air flowing through the humidifier 16.

A pipe 200 connects with the lower part of the housing 170. The pipe 200 also connects with the pump 202 which in turn connects with the pipe 204 and which pipe 204 re-enters the housing 170, above the baffles 196 and 198, and drips water from openings 206 in between the baffles 196 and 198 so as to add moisture to the incoming air. The addition of moisture to the incoming air has the beneficial effect of the gasoline burning more evenly instead of tending to explode unevenly in the internal combustion engine.

Further, there may be a circulation fan 208 in the entrance into the unit 170 so as to force air against the baffles 196 and 198. A fan is used to drive the pump, to pump water up onto the baffles.

In the housing 170, it is seen that there is a reservoir of water 210 which lies at the bottom of the housing so that the pump 202 can pump the water into the upper part of the housing and over the baffles 196 and 198 and also to allow the water to drip in between the baffles 196 and 198.

In this manner, the air entering into the humidifier 16 passing through the humidifier 16 can pick up moisture so as to raise the relative humidity.

Figure 6:
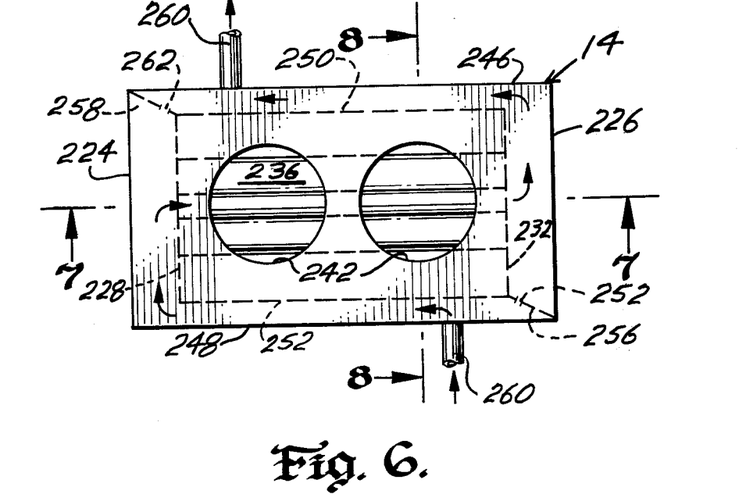
FIG. 6 is a top, plan view of the air-fuel mixture vaporizer.
Figure 7:
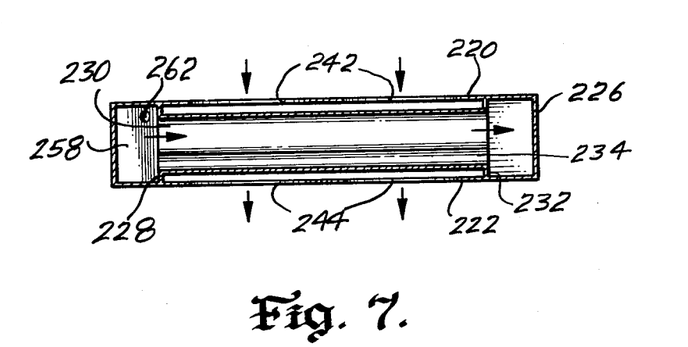
FIG. 7, taken on line 7—7 of FIG. 6, is a vertical, longitudinal, cross-sectional view illustrating the details of construction of said air-fuel mixture vaporizer; and, FIG. 8, taken on line 8—8 of FIG. 6, is a lateral, vertical, cross-sectional view of said air-fuel mixture vaporizer and illustrates the details of construction.
Figure 8:
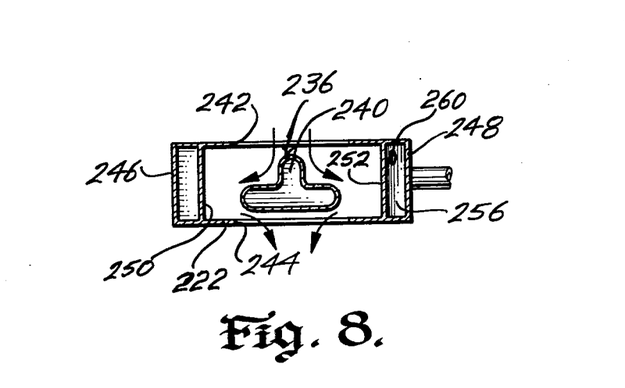

The air-fuel mixture vaporizer is illustrated in FIGS. 6, 7, and 8. The vaporizer 14 comprises a top plate 220 and a bottom plate 222. There is a side wall 224 connecting the plates 220 and 222 and also there is a side wall 226 connecting the plates 220 and 222.

There is spaced inwardly and apart from the wall 224, a wall 228 which has a central opening 230. Also, there is spaced inwardly from the wall 226 a wall 232 and 65 which wall has a central opening 234.

A central deflection tube 236 connects with the wall 228 and also connects with the wall 232.

In FIG. 8, it is seen that the deflection tube 236 is in the configuration of an inverted T wherein there is a cross member 238 and a leg 240.

In the upper plate 220, there are two spaced apart holes or passageways 242. In the lower plate 222, there are two spaced apart holes or passageways 244.

In FIG. 8, it is seen that there are outside walls 246 and 248. Spaced inwardly of the wall 246 is a wall 250. Spaced inwardly of the wall 248 is a wall 252.

In FIG. 6, it is seen that there is a baffle 256 which extends between the corner of the inner walls 232 and 252 and the corner of the outer walls 226 and 248.

Also, it is seen, in FIG. 6, that there is a baffle 258 which extends between the corner of the inner walls 228 and 250 and the corner of the outer walls 224 and 246.

There is a water inlet pipe 260 which projects through an opening in the walls 248 so as to allow water to enter the vaporizer 14. Further, there is a water outlet pipe 260 which projects through a passageway in the wall 246 so as to allow water to leave the vaporizer 14.

In practice, water enters the water inlet pipe 260 and flows between the walls 248 and 252 and then flows between the walls 228 and 224 so as to enter the center deflection tube 236. The center deflection tube 236 is positioned below the inlet opening 242 and positioned above the outlet opening 244. The water flows through the center deflection tube 246 and between the wall 232 and the wall 226 and then flows between the wall 246 and the inner wall 250. Then, the water flows out of the water outlet tube 260. Naturally, warm water from the water jacket of the internal combustion engine 10 flows through the hot water line 24 and to the hot water inlet line 260. The water flows from the vaporizer 14 and through the water outlet tube 260 to the line 26 which leads to the car radiator 18.

In the baffle 256, there is a hole or passageway 260. In the baffle 258, there is a hole or passageway 262. The holes 260 and 262 allow some circulation of hot water in the vaporizer 14 other than through the center deflection tube 236.

In effect, the air-fuel mixture flows from the carburetor 60 and into the air-fuel mixture vaporizer 14. The center deflection tube 236 is hot, approximately, the temperature of the water leaving the water jacket of the internal combustion engine. The air-fuel mixture from the carburetor 14 comes in contact with the hot center deflection tuber, at a temperature in the range of about 170° F to, approximately, 180° F, and if there are drops of fuel in this air-fuel mixture, the hot center deflection tube 236 vaporizes these drops of fuel so as to have a vapor of fuel and air. Further, the shape of the center deflection tube 236 is such as to lend turbulence to the air-fuel mixture from the carburetor 60 and such turbulence assists in vaporizing the drops of fuel.

I consider that the air-fuel mixture vaporizer 14 assist in forming a homogonous air-fuel mixture and is of value in the formation of this homogonous air-fuel mixture.

From the foregoing, it is seen that I have provided a combination of individual components, such as a fuel expander 12, the air-fuel mixture vaporizer 14, and the humidifier 16. It is possible to use these components in combination with each other or to use the components separately.

The fuel expander 12 can readily be used alone in combination with the internal combustion engine 10 to increase the gas mileage as indicated earlier in this specification. Or, the vaporizer 14 can be used alone in combination with the carburetor 60 and the internal combustion engine 10. For maximum efficiency in the burning of fuel, it is advisable to use the expander 12, the vaporizer 14, and the humidifier 16 in combination. The humidification of air for burning in an internal combustion engine as, previously, explained is beneficial giving a more even burning of the fuel in the internal combustion engine and a more complete burning of the fuel in the internal combustion engine.

I consider the foregoing invention to be new and useful as required by 35 USC 101 which states:

"Inventions patentable. Whoever invents or discovers any new and useful process, machine, manufacture, or composition of matter, or any new and useful improvement thereof, may obtain a patent therefor, subject to the conditions and requirements of this title."

I consider this invention to be new as, to the best of my knowledge, I have never seen a fuel expander like the fuel expander 12 and I have never seen an air-fuel mixture vaporizer like my air-fuel mixture vaporizer 14. Further, I have never seen a humidifier like my humidifier 16.

In regard to being useful, I consider that this invention is useful as the fuel expander 12, by itself, is capable of increasing the energy realized from a given volume of fuel which means better mileage from fuel, such as gasoline. Further, the vaporizer 14 is useful as it vaporizes small drops of fuel so as to have a more homogonous air-fuel mixture. The humidifier 16 is useful as it adds water to the air going to the carburetor and, as is well known, a mixture of air and fuel which has a high humidity or water added results in a more even burning of the air-fuel mixture and results in more energy realized from the burning of the fuel and also results in a more clean exhaust from the internal combustion engine 10.

35 USC 103 states:

"Conditions for patentability; non-obvious subject matter. A patent may not be obtained though the invention is not identically disclosed or described as set forth in section 102 of this title, if the differences between the subject matter sought to be patented and the prior art are such that the subject matter as a whole would have been obvious at the time the invention was made to a person having ordinary skill in the art to which said subject matter pertains. Patentability shall not be negatived by the manner in which the invention was made."

I consider that the subject invention is unobvious as I am not aware of a fuel expander, other than my fuel expander 12, which can maintain the temperature of the fuel being introduced into the carburetor in a relatively narrow range of about 10° F as my fuel expander 12 maintains the temperature of the fuel entering the carburetor 60 in the range of about 130° to 140° F. My fuel expander 12 can maintain this temperature even though the fuel 56 in the fuel tank 50 is a temperature less than 130° F or the fuel 56 in the fuel tank 50 is at a temperature greater than 140° F. Further, my air-fuel mixture vaporizer 14 is unobvious as I have never seen such a vaporizer 14. And, the humidifer 16 is unobvious as I have never seen such a humidifier for humidifying air being introduced into the carburetor 16.

Prior to preparing this patent application, a patent search was made and the following patents were found in that patent search. These are: U.S. Pat. Nos. 1,141,450; 1,217,233; 1,236,267; 1,271,306; 1,292,653; 1,300,600; 1,318,068; 1,323,413; 1,361,503; 1,809,531; 1,997,497; 2,179,235; 3,110,296; 3,253,647; 3,354,872; 3,472,214; 3,509,859; 3,511,218; 3,672,342; 3,699,938; 3,741,180; 3,765,382.

From the foregoing, and having presented my invention, what I claim is:

1. A fuel expander comprising:
   a. a housing for housing a liquid;
   b. a cold water inlet connecting with said housing:
   c. a hot water inlet connecting with said housing;
   d. a heat sensitive means inside said housing;
   e. a valve means functioning with said cold water inlet, and with said hot water inlet for controlling the flow of cold water and for controlling the flow of hot water into said housing to achieve a heating water of a desired temperature and also connecting with said heat sensitive means;
   f. A fuel line positioned in said housing for flowing fuel through said housing and to heat said fuel to a temperature approximately that of said heating water of a desired temperature; and,
   g. said heat sensitive means in reacting to the temperature in the housing moving said valve means to regulate the flow of hot water through said hot water inlet and to regulate the flow of cold water through said cold water inlet.

2. A fuel according to claim 1, and comprising:
   a. an auxiliary heating means connecting with said housing to assist in heating said heating water to realize said desired temperature.

3. A fuel expander according to claim 1, and comprising:
   a. a second fuel line positioned in said housing and connecting with a carburetor and for flowing fuel from the carburetor through the housing and back to the carburetor.

4. A fuel expander according to claim 3, and comprising:
   a. an auxiliary heating means connecting with said housing to assist in heating said heating water to realize said desired temperature.

5. A combination of an internal combustion engine and fuel processing apparatus for said internal combustion enginer, said combination comprising:
   a. said internal combustion engine;
   b. a carburetor;
   c. a fuel expander comprising a housing for housing a liquid;
   d. a cold water inlet connecting with said housing;
   e. a hot water inlet connecting with said housing;
   f. a heat sensitive means inside said housing;
   g. a valve means functioning with said cold water inlet, and with said hot water inlet for controlling the flow of cold water and for controlling the flow of hot water into said housing to achieve a heating water of a desired temperature and also connecting with said heat sensitive means;
   h. a fuel line positioned in said housing for flowing fuel through said housing and to heat said fuel to a temperature approximately that of said heating water of a desired temperature;
   i. said heat sensitive means in reacting to the temperature in the housing moving said valve means to regulate the flow of hot water through said hot water inlet and to regulate the flow of cold water through said cold water inlet;
   j. said fuel connecting with said carburetor for introducing fuel to said carburetor; and, k. said carburetor being positioned in relation to said internal combustion engine to introduce an air-fuel mixture vapor into said internal combustion engine.

6. A combination according to claim 5, and comprising:
   a. an auxiliary heating means connecting with said housing to assist in heating said heating water to realize said desired temperature.

7. A combination according to claim 5, and comprising:
   a. a second fuel line positioned in said housing and connecting with a carburetor and for flowing fuel from the carburetor through the housing and back to the carburetor.

8. A combination according to claim 7, and comprising:
   a. an auxiliary heating means connecting with said housing to assist in heating said heating water to realize said desired temperature.

9. A combination according to claim 5, and comprising:
   a. a humidifier for humidifying air flowing to the carburetor to produce humidified air;
   b. said humidifier comprising a humidifier housing;
   c. said humidifier housing having an inlet and outlet;
   d. said humidifier housing outlet being positioned in relation to said carburetor to introduce said humidifying air into said carburetor;
   e. said humidifier housing having a lower reservoir for water and providing a region of contact for air and water; and,
   f. said humidifier housing having a baffle for agitation of the air flowing in the humidifier housing.

10. A combination according to claim 9, and comprising:
    a. said humidifier housing having a means for forming drops of water to increase the surface area of the water to increase the humidification of the air flowing in said humidifier housing.

11. A combination according to claim 5, and comprising:
    a. an air-fuel mixture vaporizer comprising an air-fuel mixture vaporizer housing;
    b. said housing having an air-fuel mixture vapor inlet and having an air-fuel mixture vapor outlet;
    c. said air-fuel mixture vaporizer inlet being positioned with respect to said carburetor to receive said air-fuel mixture vapor;
    d. said air-fuel mixture vaporizer outlet being positioned with respect to said internal combustion enginer to introduce an air-fuel mixture vapor into said combustion engine;
    e. said air-fuel mixture vaporizer housing having a liquid circulation line for a heating liquid;
    f. said liquid circulation line having an inlet and having an outlet for connecting with a source of fuel in the carburetor for allowing fuel to flow from the carburetor, through the air-fuel mixture vaporizer housing and to said internal combustion engine.

12. A combination according to claim 11, and comprising:
    a. said air-fuel mixture vaporizer housing having an outer wall and an inner wall defining an outer circulation chamber;
    b. said liquid circulation line connecting with said outer circulation chamber so that liquid can flow in said outer circulation chamber and said liquid circulation line; and,
    c. said liquid circulation line being in the path of flow of said air-fuel mixture vapor to assist in the transfer of heat energy from said liquid circulation line to said air-fuel mixture vapor.

13. A combination according to claim 12, and comprising:
    a. said liquid circulation line, in a cross-sectional view, presenting the appearance of an inverted T with the leg of the T being directed into the incoming flow of the air-fuel mixture vapor.

14. A combination according to claim 11, and comprising:
    a. a humidifier for humidifying air flowing to the carburetor to produce humidified air;
    b. said humidifier comprising a humidifier housing;
    c. said humidifier housing having an inlet and outlet;
    d. said humidifier housing outlet being positioned in relation to said carburetor to introduce said humidifying air into said carburetor;
    e. said humidifier housing having a lower reservoir for water and providing a region of contaat for air and water; and,
    f. said humidifier housing having a baffle for agitation of the air flowing in the humidifier housing.

15. A combination according to claim 19, and comprising:
    a. said humidifier housing having a means for forming drops of water to increase the surface area of the water to increase the humidification of the air flowing in said humidifier housing.

* * * * *